United States Patent [19]

Blanthorn et al.

[11] Patent Number: 4,961,943
[45] Date of Patent: Oct. 9, 1990

[54] PROCESS OF PREPARING CEREAL-COATED DRIED FRUIT

[75] Inventors: Michele Blanthorn, Hoboken, N.J.; Glen Labaw, Greenwich, Conn.

[73] Assignee: Nabisco Brands, Inc., East Hanover, N.J.

[21] Appl. No.: 467,858

[22] Filed: Jan. 22, 1990

[51] Int. Cl.$^5$ .............................................. A23L 1/212
[52] U.S. Cl. .................................. 426/102; 426/293; 426/295; 426/303; 426/307; 426/639
[58] Field of Search ................. 426/102, 639, 99, 103, 426/295, 293, 306, 303, 307, 302, 619, 620

[56] References Cited

U.S. PATENT DOCUMENTS

| | | | |
|---|---|---|---|
| 1,884,923 | 10/1932 | Cresswell | 426/99 |
| 2,693,419 | 11/1954 | Gager | 426/102 |
| 2,909,435 | 10/1959 | Watters | 426/102 |
| 3,395,022 | 7/1968 | Vollink | 426/620 |
| 3,792,183 | 2/1974 | Lyall et al. | 426/307 |
| 3,868,471 | 2/1975 | Decelles et al. | 426/303 |
| 3,931,434 | 1/1976 | Murai | 426/102 |
| 3,958,021 | 5/1976 | Cook | 426/293 |
| 4,038,427 | 7/1977 | Martin | 426/285 |
| 4,061,790 | 12/1977 | Cole | 426/99 |
| 4,207,347 | 6/1980 | D'Atri | 426/102 |
| 4,256,772 | 3/1981 | Shanbhag | 426/620 |
| 4,356,197 | 10/1982 | Devitt | 426/102 |
| 4,522,833 | 6/1985 | Sharma | 426/93 |
| 4,594,252 | 6/1986 | Niemczyk | 426/307 |
| 4,647,463 | 3/1987 | Hoover | 426/291 |
| 4,663,175 | 5/1987 | Werner et al. | 426/289 |
| 4,696,824 | 9/1987 | Meczkowski | 426/303 |

FOREIGN PATENT DOCUMENTS

| | | | |
|---|---|---|---|
| 1021991 | 12/1977 | Canada . | |
| 2705718 | 8/1978 | Fed. Rep. of Germany . | |
| 226765 | 9/1985 | Fed. Rep. of Germany | 426/639 |
| 2508280 | 12/1982 | France . | |
| 58-111651 | 7/1983 | Japan . | |
| 62-36162 | 2/1987 | Japan | 426/639 |
| 7213715 | 12/1972 | Netherlands . | |
| 1247979 | 9/1971 | United Kingdom . | |

Primary Examiner—Carolyn Paden

[57] ABSTRACT

A coated dried fruit piece is prepared by applying a coating of a melted fat or oil followed by a dusting of a dry particulate coating. The steps may be repeated as desired to build a coating of a desired thickness. The dry particulate coating includes a cereal component, such as wheat germ or shredded wheat fines, a sweetener and preferably a nut meal. The cereal component has a particle size sufficiently large to form a coating with crunchy particulates over the soft dried fruit. The particle size of the cereal component is sufficiently small to ensure the particles will adhere to the dried fruit pieces.

31 Claims, No Drawings

PROCESS OF PREPARING CEREAL-COATED DRIED FRUIT

FIELD OF THE INVENTION

This invention relates to a dried fruit piece having a coating made from essentially a fat component and a cereal component having a crunchy texture. This invention further relates to a method of producing the product. More specifically, the present invention relates to a snack food or breakfast cereal where the coating retains its crunchy texture during storage and the fruit center remains soft and chewy.

BACKGROUND OF THE INVENTION

Breakfast cereals and snack foods represent a significant portion of the market for cereal products. Most frequently, the breakfast cereals are in the form of flakes, biscuits or other desired shapes. The breakfast cereals are generally prepared by cooking the ingredients in the form of a dough, and extruding the dough under pressure to expand and puff the dough. The extrudate is cut into bite-size pieces during or after extrusion and dried. Additional methods of preparing cereal products include shredding to form products such as shredded wheat.

Breakfast cereals and snack foods have often been combined with dried fruits and packaged in a ready-to-eat form. The most commonly used fruits are raisins, which are blended with ready-to-eat cereals such as corn flakes, bran flakes, and wheat flakes. Breakfast cereals containing raisins have achieved consumer acceptance, due in part to the combination of the crispy texture of the cereal and the soft texture and sweet taste of the raisin. In prepared ready-to-eat breakfast cereals, the raisins are, however, prone to moisture loss during packaging. The moisture content of the raisin is inherently generally higher than the moisture content of the cereal. Raisins generally have a moisture content of about 13% to 18%, while breakfast cereals generally have less than 5%. When the raisins and the breakfast cereals are combined and packaged in moisture proof materials, the raisins tend to lose a significant portion of the moisture and become hard and difficult to chew. The cereal, on the other hand, may absorb the moisture lost from the raisins and become soft and no longer crisp. Moreover, the increased moisture level of the cereal may result in a loss of the shelf stable characteristics of the cereal. Moisture migration between the various components of the cereal mix will typically result in a loss of consumer acceptance of the product.

The industry has sought to overcome the inherent difficulties in preparing breakfast cereals from a combination of dried fruits, such as raisins, and a crispy, ready-to-eat cereal. One proposed method has been to use freeze dried fruits. Freeze dried fruits have the advantage of being easily rehydrated when immersed in milk and being shelf stable for long periods of time. The cost of freeze dried fruits has, however, inhibited their extensive use in cereals. In addition, the flavor and texture of freeze dried fruits upon rehydration has not achieved extensive consumer acceptance. The flavor and texture of freeze dried fruits is generally inferior to the flavor of fresh fruit pieces.

Another effort to prevent the extensive migration of moisture from fruit pieces is to apply a coating of wax, such as beeswax, or a fat or oil on the surface fruit. The fat or oil is generally a solid or semi-solid at room temperature. The fat coating may serve as a moisture barrier to reduce the migration and loss of moisture from the fruit piece. This type of coated fruit product has the disadvantage of having a soft, waxy coating.

Other methods to reduce the loss of moisture and the loss of the desirable texture of fruit pieces include infusing the fruit piece with a humectant or other solution that retains the moisture in the fruit. Examples of these solutions that are infused into dried fruits include sugars and polyhydric alcohols.

The effects of moisture migration on the cereal is particularly noticeable in products having a dried fruit piece core and a coating of a cereal composition such as in cookies and granola type snacks. Since the cereal coating is in direct contact with the fruit piece, the cereal generally becomes soft and soggy during storage as the moisture from the fruit migrates into the cereal.

The current trend in consumer purchases of cereals and snack foods is toward products having no preservatives or artificial additives. These trends in consumer purchasing therefore limit the methods available for producing shelf stable cereals and dried fruits.

Many of the breakfast cereals currently on the market include sugar or other sweeteners. The sweeteners may be mixed with the dough composition before shaping the dough pieces. Alternatively, the sweeteners may be applied as a coating to the cereal pieces by spraying or dipping. The coated cereal pieces are then dried in an oven or in a bed of heated air. This type of coating process generally produces a sweet coating that dissolves quickly in milk and loses its sweet taste. As the coating dissolves, the cereal pieces also quickly lose their crunchy texture when immersed in milk.

Other breakfast cereals are provided with flavored coatings that at least partially dissolve in milk to release the flavor to the milk. The flavored cereal pieces are generally prepared by first applying a sugar solution to the dried cereal and applying a dusting of a dry flavor composition. The sugar solution generally serves as an adhesive for the flavor composition. These coatings do not generally result in a coating which allows the cereal to remain crispy in milk for extended periods of time.

Dried fruit pieces and, in particular, raisins, have been prepared for use in food products by applying a flavored coating composition to the fruit piece. For example, raisins have been coated with an aqueous solution of starch and sugar followed by dry powder coatings, sugar, salt and flavors. The coating steps may be repeated several times to increase the thickness of the layer. These coating do not provide a crunchy texture to the finished product.

The present invention is directed to a method of preparing a dried fruit piece having a coating of a fat and a crunchy cereal composition. The coated product is shelf stable for extended periods and retains its crunchy texture in milk. Moisture in the dried fruit is substantially inhibited from migrating into the coating such that the coating retains the crunchy texture and the fruit remains soft.

SUMMARY OF THE INVENTION

This invention is directed to a method of producing a product having a dried fruit piece center and an outer coating of a fat and cereal-based composition, wherein the coating has a crunchy texture. The coated fruit pieces are suitable for consuming as a snack food or as a ready-to-eat breakfast cereal. The fat component of the coating resists the migration of moisture from the fruit such that the fruit piece retains sufficient moisture to maintain its soft texture. Similarly, the fat in the coating prevents the migration of moisture to the cereal component of the coating whereby the coating retains its crunchy texture. As a result, during prolonged storage the dried fruit pieces do not become hard and the cereal coating does not become soft or soggy. The coating is further able to maintain its crunchy texture for prolonged periods of time when immersed in milk.

The fruit pieces may be any dried fruit generally used in preparing snack foods and breakfast cereals. Examples of such fruits include raisins, prunes, cherries, apples, pineapple, figs, bananas, dates, currants, apricots and "craisins" or dried cranberries.

The crunchy character of the coating composition is imparted by suitable cereal components such as, for example, shredded wheat fines. The coating composition is preferably a dry blend of a fat, shredded wheat fines, a sweetener and a suitable flavoring. Wheat germ may be used as the cereal component although wheat germ does not produce a coating that is as crunchy as when shredded wheat fines are used. The sweetener may be any sweetener generally used with cereals for example, sucrose, fructose, dextrose, dry honey, non-nutritive sweeteners and the like. The flavoring composition is preferably a nut meal of, for example, almonds, walnuts, hazel nuts or peanuts.

The product is prepared by selecting a suitable dried fruit and placing the fruit in a coating apparatus. A coating of a melted fat or oil is applied uniformly over the fruit pieces while continuously tumbling. While the fat or oil is in the liquid state, a dry coating composition is applied to coat the fruit pieces. The liquid and dry coating composition are sequentially applied to build up a layer of suitable thickness. A final coating of a confectioners glaze may be applied to form a gloss and to prevent the fruit pieces from sticking together.

The liquid coating is suitably a melted fat that is generally solid or semi-solid at room temperature. The fat may be, for example, a partially hydrogenated or interesterified vegetable oil or mixtures thereof. The fat is generally a mixture of saturated and unsaturated fatty acids and the glycerides thereof. The liquid coating may be for example a commercially available hard butter composition. An optional emulsifying agent may be included with the fat component.

The dry powder coating composition is a dry blend of a cereal, sweetener and a flavoring. The cereal component is generally a cereal capable of imparting a crunch texture to the finished coating. The preferred cereal component is shredded wheat fines although other cereal components such as wheat germ may be used. In the preferred embodiment of the invention the cereal component is shredded wheat fines having a particle size of about 1/32 to 1/16 of an inch in length. Shredded wheat fines in this size range generally have a distinct toasted wheat flavor and are able to produce a desirable degree of crunchiness to the coating. The particle size of the shredded wheat fines in this range further adhere to the surface of the fruit piece better than larger pieces. Other cereal components may also be added to the dry powder coating to provide some crunchiness to the coated product and enhance the consumer appeal to the product, such as for example wheat germ.

The dry powdered coating composition contains, for example, from about 20% to about 50% by weight cereal, about 25% to about 40% by weight sweetener, and less than about 1% salt. The composition may optionally contain about 25% to about 50% by weight of a powdered nut meal. In one embodiment of the invention the dry composition contains about 35% by weight shredded wheat fines, 33% by weight almond meal, 31% by weight powdered sugar and less than 1% salt.

The finished product is made up of about 25% to about 50% by weight fruit pieces, 25% to about 50% by weight dry coating and about 10% to 25% by weight of the fat or oil component. When a confectionery glaze is used, the glaze makes up about 0.4% by weight of the finished product. In one embodiment of the invention the fruit pieces and the dry coating each make up about 42% by weight of the product. The fat or oil component makes up about 16% by weight of the finished product.

The fat or oil component is generally heated to melt the fat. The melted fat is then applied to the fruit pieces alternately with the dry coating until a layer of suitable thickness is achieved. The coated fruit pieces are then cooled to room temperature and packaged.

DETAILED DESCRIPTION OF THE INVENTION

The present invention is directed to dried fruit having a coating of a fat and cereal-based composition. The coating composition is soft but has a crunchy texture due to the crunchy particulates in the coating. The invention further relates to a method of producing the coated dried fruit. The product has a soft fruit core and a smooth and crunchy outer coating. The fat component of the coating composition substantially inhibits the migration of moisture from the fruit core to the cereal component. As a result, the fruit core remains moist and soft and the cereal component retains the crunchy texture during storage. The coating further resists becoming soggy when immersed in milk due to the fat component.

The fruit produced according to the invention is prepared by selecting a dried fruit and placing the fruit in a suitable coating apparatus, such as a tumbling coating pan. The fruit is tumbled and a liquid coating composition is added to completely coat the fruit pieces. Immediately thereafter, a dry coating composition is added to the coated fruit pieces. The liquid and dry coating steps are sequentially repeated to form a layer of the coating on the fruit pieces. A confectioners glaze may then be added to the tumbling fruit pieces to prevent the pieces form sticking together and to provide a glossy surface as desired. The coated fruit pieces are then removed from the tumbler and cooled to room temperature.

The dried fruit core may be a dried and/or candied fruit generally used in snack foods and breakfast cereals. Suitable dried fruits include raisins, prunes, cherries, apples, pineapple, bananas, apricots, figs, dates, cranberries or currants. The preferred dried fruits are raisins. Whole fruits that are too large to effectively dry are generally cut and diced into uniform pieces and dried by heated forced air according to conventional practices. The moisture content of the fruit will vary depending on the type of fruit. Generally, the optimum moisture level of the fruit depends on the type of fruit being dried. The moisture content must be reduced to a sufficiently low level to be shelf stable. For example, raisins are generally adjusted to about 13% to 18% moisture by weight. Low moisture raisins are generally available having about 12% to about 13% moisture. Other fruits may be dried to similar moisture levels depending on the type of fruit. The moisture content of the dried fruit pieces influence the shelf stable character, eating qualities, and texture of the fruit. As the moisture content of the fruit pieces is lowered, the hardness is generally increased.

The liquid coating composition is a fat or oil that is generally solid or semi-solid at room temperature. The fat component is selected to inhibit moisture migration from the fruit and to provide a desirable taste and texture to the product. The fats that are particularly suitable have a melting point between 90° F. and 50° F. The fats generally used in the present invention have a melting point of about 95° F. to about 105° F.

The fat or oil may be selected from partially hydrogenated and/or interesterified vegetable oils that are commercially available. The vegetable fats generally include a mixture of fatty acids and the glycerides thereof. Examples of suitable vegetable fats that may be used include corn oil, cottonseed oil, peanut oil, soybean oil, olive oil, safflower oil, sesame oil, sunflower oil, cocoa butter and the like. Alternatively, the fat may include lard, tallow or other animal fats, although the vegetable oils are generally preferred.

Among the preferred fats are the hard butters containing glycerides of various fatty acids. One such commercially available hard butter is sold under the trademark KAOMEL by Durkee Industrial Foods Corporation. This hard butter is a blend of glycerides of lauric acid, myristic acid, palmitic acid, stearic acid, oleic acid, elaidic acid and linoleic acid. The lauric acid content of the preferred fats is low to reduce the soapy taste. The fat may contain an optional emulsifying agent such as, for example, lecithin. Many commercially available fats and hard butters typically include an emulsifying agent. When the addition of an emulsifying agent is desired, the fat is melted and the emulsifying agent blended before being added to the coating apparatus and the fruit pieces.

The dry powder composition contains a sweetener and a component, such as a cereal, to provide a crunchy texture to the finished coating. The finished coating is generally soft although the addition of a suitable cereal component, and in particular shredded wheat fines, produce a crunchy texture to the coating. The crunchy texture of the coating is in the form of crunchy cereal particulates throughout the coating. Additional ingredients may be blended with the dry composition, such as flavors, salt, cocoa, colors and the like. The cereal component may be ground or crushed cereal flakes or pieces that are capable of producing a crunchy texture in the finished coating. The preferred components include for example, wheat germ or shredded wheat fines since these impart a crunchy texture to the coating. Shredded wheat fines are preferred where a particularly crunchy product is desired. Wheat germ is desirable for the healthful implications associated with wheat germ and the consumer acceptance of the product. The dry coating may alternatively be a blend of shredded wheat fines and wheat germ as well as any other suitable particulate cereal component such as oat bran or wheat bran.

In the preferred embodiment of the invention the cereal component is shredded wheat fines having a particle size of about 1/32 to about 1/16 inch. Shredded wheat fines in this range are particularly desirable since they are able to impart a toasted wheat flavor. Particle sizes substantially smaller than 1/32 inch tend to dilute the toasted flavor of the shredded wheat and are, therefore, generally less preferred. Shredded wheat fines greater than about 1/16 inch may be difficult to adhere to the dried fruit piece. For example, the irregular shape of raisins prevents the larger size shredded wheat fines from adhering to the surface of the raisin.

The sugar component may be granular sucrose, fructose, dextrose, brown sugar or the like. Other sweeteners such as corn syrup, corn syrup solids and invert sugars may be used. In the preferred embodiment of the invention, brown sugar is used as the sweetener. Sugar syrups, however, may be used in amounts such that the composition is substantially dry and free flowing to be dusted onto the fruit pieces during the coating step.

In an alternative embodiment, the sweetener may be a non-nutritive sweetener such as aspartame, saccharine and cyclamates. The non-nutritive sweetener may be blended with a suitable bulking agent such as oat bran, wheat bran, corn bran and modified celluloses. One example of a suitable modified cellulose is hollocellulose. The bran and the modified celluloses may contribute to the crunchiness of the coating.

The dry coating composition preferably contains at least one optional flavoring component such as a nut flavor, cocoa or a complementary fruit flavor. In the preferred embodiment the dry coating composition contains nut meal or nut particles. Exemplary nut meals or particles include almond, walnut, hazelnut, pecan, macadamia nut and peanuts. The nut meal generally has a particle size of about 12 to 16 mesh. Particle size greater than about 12 mesh may be difficult to adhere to the fruit pieces.

In embodiments of the invention, the dry coating includes a blend of nut meal, shredded wheat fines and a sweetener. The shredded wheat fines are particularly desirable when blended with a nut meal such as almond meal. When a nut meal is included in the dry coating, it is particularly desirable to include shredded wheat fines. The nut meal generally has a soft texture but when blended with the shredded wheat fines, the finished coating has a crunchy texture. The consumer tends to associate the crunchy texture of the coating with the nut component although the crunchiness is predominantly due to the shredded wheat fines. The nut meal generally has a sufficiently small particle size that when consumed, the nut meal does not have a crunchy texture as usually found in whole nuts.

An optional coloring agent may also be added to the dry composition to enhance the consumer appeal. The coloring agent may be in either liquid or particulate form. When a coloring agent is desired, the color is generally selected to complement the flavor and appearance of the finished product.

The liquid fat coating may alternatively contain a coloring agent and/or a flavor. Suitable flavors are preferably at least partially soluble or miscible in the fat. Examples of suitable flavors that may be added to the fat include chocolate liquor, cocoa, and nut oils such as almond or walnut oils.

The fruit piece that has been coated with the fat and the cereal coating may be coated with an optional confectioners glaze. The glaze produces a slight gloss on the surface of the coated fruit piece and reduces the tendency of the fruit pieces to stick together. One type of confectioners glaze is sold under the trademark OPAGLOS by Colorcon, Inc. This confectioners glaze is a modified shellac that is able to provide a smooth and glossy surface and, when used in sufficient amounts, may serve as a moisture barrier.

The coated fruit pieces may be packaged and consumed as a snack type food or combined and mixed with ready-to-eat cereals. The cereals are generally formed into suitable shapes such as biscuits, flakes, and annular shaped pieces. The cereal may include one or more whole grains or flours, for example from wheat, corn, oats, barley, rye, rice, sorghum and the like. The cereal may be vitamin and mineral enriched. The cereals are generally prepared by forming a dough and cooking. The cooked dough is then extruded under pressure into cereal pieces. The cereal dough may be rolled, flaked, or expanded as well known in the art.

The composition of the dry coating may be varied according to the particular characteristics of the dried fruit pieces. The desired flavor, coating thickness and crunchy character of the coating will further influence the composition. The dry coating composition may contain for example, about 20% to about 50% by weight of the cereal component, about 25% to about 50% by weight sweetener, less than about 1% by weight salt and a flavor component in an effective amount. In the embodiments including a nut meal, such as almond meal, the nut meal is generally included in the amount of about 25% to about 40% by weight of the coating composition. The cereal component is generally blended with an equal amount of the sweetener based on the weight percent. The particular sweetener used and the level of sweetness desired will determine the proportion of sweetener in the dry coating composition. The amount of sweetener may be greater or less than the amount of the cereal component present in the dry coating composition. In the embodiments including a nut meal, the cereal component, nut meal, and sugar are generally combined in about equal proportions. In the preferred form of the invention the cereal component, nut meal, and sweetener each make up about 30% to about 40% by weight of the dry coating composition. A particularly suitable dry coating composition may include, for example, about 36% by weight of the cereal component, about 33% by weight nut meal, about 30% by weight sweetener, and less than about 1% by weight salt.

The finished coated fruit piece will be made up of the dried fruit, the dry coating composition, fat component and the confectioners glaze. The dried fruit component will make up about 25% to about 50% by weight of the finished coated product. The remaining portion of the finished product will include about 25% to about 50% by weight of the dry coating composition, about 10% to about 25% by weight of the fat component and less than 1% of the confectioners glaze. In the preferred form of the invention, the finished product contains about 35% to about 45% by weight of the dried fruit, about 35% to about 45% by weight of the dry coating composition and about 10% to about 20% of the fat component. In the finished product the dried fruit component and the dry coating composition are preferably present in equal proportions. In one embodiment of the invention the finished coated product will include about 42% by weight of the dried fruit pieces, about 42% by weight of the dry coating composition and about 16% by weight of the fat component.

In another embodiment, raisins are selected as the fruit pieces according to their preferred size and moisture content. The raisins are then added to a rotating coating drum and tumbled to separate any agglomerated raisins. The fat component is weighed and measured in the desired amount based on the weight of the raisins added to the coating drum. The fat component is heated to melt the fat to a pumpable consistency. An optional emulsifying agent, such as lecithin, may be blended at this time with the melted fat while being continually heated. Similarly, a flavoring agent may be blended with the melted fat. The fat component is then tempered at an appropriate temperature for the particular fat being used. Tempering may, for example, be carried out at about 90° F. to about 95° F.

The dry components of the coating composition are then separately weighed and blended uniformly. A portion of the melted fat component is added to the coating drum while continuously tumbling the raisins to completely coat the raisins. The temperature of the drum may be at ambient temperature depending on the consistency and melting point of the fat. The temperature of the coating drum alternatively may be maintained at a sufficient temperature to prevent the fat component from immediately solidifying when added to the coating drum and prevent excessive amounts of the fat from adhering to the inner surface of the drum. After the raisins have been coated with the fat component, a portion of the dry coating composition is added to the coating drum to apply a dry coating to the raisins. The melted fat component and the dry coating composition are alternately added to the coating drum until the measured proportions are depleted. By alternately applying the melted fat component followed by the dry coating composition, a layer of the coating may be built up on the surface of the raisins to a desired thickness. The final coating on the raisins may be the dry coating composition to produce a dry appearance. Alternatively, the melted fat component may be the final component added to the tumbling raisins to produce a smoother appearance to the raisins. When the measured fat component and dry coating composition have been completely added to the coating drum, the raisins are continuously tumbled for several minutes to uniformly distribute the composition and to prevent the coated raisins from sticking together.

While continuously tumbling the raisins, the optional confectioners glaze may then be added to the coating drum to produce a slightly glossy appearance to the coated raisins. The confectioners glaze forms a film on the coated raisins which contributes to the moisture resistance of the coating and prevents stickiness of the coating.

The fruit pieces are most advantageously coated using a rotating coating drum. The fruit pieces are added to the drum while continuously being rotated. The fat component and the dry coating composition are subsequently added to the fruit pieces in the rotating drum. The coating drum is rotated at an appropriate speed to insure the fruit pieces are agitated sufficiently to be completely coated by the coating composition.

Although a rotating coating drum is the preferred coating apparatus, other coating devices may be employed in practicing the present invention. Other suitable coating apparatus may include, for example, an open trough having a semi-circular cross section which is provided with a rotating helical auger. The rotating auger produces a tumbling action to the fruit pieces in the trough and conveys the fruit pieces from the intake into the discharge end. The tumbling action insures a uniform coating is applied to the fruit pieces. The speed of rotation of the auger may be varied to provide a desired throughput rate and to control the thickness of the finished coating on the fruit pieces.

The fruit pieces are generally added to the appropriate coating apparatus at ambient temperature followed by the addition of the melted fat component. The dry coating composition is then added to the fatcoated fruit pieces. The combined blend of fruit pieces and the melted fat component and the dry coating composition is agitated for a sufficient time to uniformly disperse the coating. The length of time of the agitation will depend on the desired thickness of the coating, the proportions of the melted fat component and the dry coating composition and the melting point of the fat component.

The coated fruit pieces are discharged from the coating apparatus and transferred to a slotted tray where the pieces are cooled to room temperature by forced air. The coated fruit pieces may be screened, either before the cooling step or after the cooling step, to remove any of the particulates from the dried coating composition that have not adhered to the fruit pieces. When the coated fruit pieces have sufficiently cooled, they may then be transferred to a suitable packaging and handling system. The dried fruit pieces may be packaged as a snack food or blended with other food components, such as a ready-to-eat breakfast cereal in the form of flakes, or biscuits or other shapes.

The following examples exemplify the preferred embodiments of the present invention. All temperatures are in degrees Fahrenheit unless otherwise indicated.

EXAMPLE I

Raisins were coated with a wheat germ and almond meal coating where the proportions are as follows:

|  | % weight | % weight |
|---|---|---|
| RAISINS: Thompson Seedless Select |  | 41.67 |
| DRY COATING: |  | 41.67 |
| Roasted Wheat Germ, Canadian Harvest | 35.80 |  |
| Almonds, Blue Diamond Natural Meal, 12M Cut | 33.30 |  |
| Powdered Brown Sugar, Amstar | 30.00 |  |
| Flour Salt | 0.90 |  |
| LIQUID COATING: |  | 16.66 |
| Durkee Kaomel Flakes (Partially Hydrogenated Vegetable Oil) | 96.00 |  |
| Lecithin, Lucas Meyer Metarin RA-51 | 4.00 |  |
|  |  | 100.00 |

The coated raisins were prepared by introducing the raisins to a rotating coating pan and tumbling the raisins for about 1 minute. The fat component was melted by heating to about 90° F. to 93° F. and blended with the lecithin. The dry coating composition was prepared by uniformly blending the dry ingredients. The melted fat component and the dry powder coating blend were alternately added to the coating pan while continuously tumbling the raisins until the components were depleted. The raisins were tumbled for about 5 minutes at ambient temperature to uniformly coat the raisins. A confection glaze was then added in the amount of about 0.4% by weight based on the finished coated raisins and tumbled for about one minute. The coated raisins were then transferred to a slotted cooling tray and cooled to room temperature using forced air.

The coated raisins had a soft core and a smooth outer coating with crunchy particulates. The textures of the coated raisins remain constant during storage in a sealed container.

EXAMPLE II

Raisins were coated with a wheat germ and almond meal coating and an almond flavored liquid coating to produce a coated raisin having distinctive toasted almond flavor where the proportions are as follows:

|  | % weight | % weight |
|---|---|---|
| RAISINS: Thompson Seedless Select |  | 41.67 |
| DRY COATING: |  | 41.67 |
| Roasted Wheat Germ, Canadian Harvest | 35.80 |  |
| Almonds, Blue Diamond Natural Meal, 12M Cut | 33.30 |  |
| Powdered Brown Sugar, Amstar | 30.00 |  |
| Flour Salt | 0.90 |  |
| LIQUID COATING: |  | 16.66 |
| Durkee Kaomel Flakes (Partially Hdrogenated Vegetable Oil) | 94.12 |  |
| Lecthin, Lucas Meyer Metarin RA-51 | 3.92 |  |
| McCormick Toasted Almond Flavor, Oil Soluble, No. F44871 | 1.96 |  |
|  |  | 100.00 |

The coated raisins were prepared by introducing the raisins to a rotating coating pan and tumbling the raisins for about 1 minute. The fat component was melted by heating to about 90° F. to 93° F. and then blended with the lecithin. The dry coating composition was prepared by uniformly blending the dry ingredients. The melted fat component and the dry powder coating blend were alternately added to the coating pan while continuously tumbling the raisins until the components were depleted The coating steps were carried out to produce a drier appearance to the coating by applying a portion of the dry coating composition as the final coat. The raisins were tumbled for about 5 minutes at ambient temperature to uniformly coat the raisins. The coated raisins were then transferred to a slotted cooling tray and cooled to room temperature using forced air.

The coated raisins had a soft core and a smooth outer coating. The coating was somewhat soft with a slightly crunchy texture of the wheat germ. The textures of the coated raisins remain constant during storage in a sealed container.

EXAMPLE III

Raisins were coated with a wheat germ, almond meal and cocoa coating where the proportions are as follows:

|  | % weight | % weight |
|---|---|---|
| RAISINS: Thompson Seedless Select |  | 41.67 |
| DRY COATING: |  | 41.67 |
| Almonds, Blue Diamond Natural Meal, 12M Cut | 33.10 |  |
| Powdered Brown Sugar, Amstar | 29.90 |  |
| Roasted Wheat Germ, Canadian Harvest | 21.50 |  |
| Tiko Cocoa | 11.10 |  |
| Icing Sugar, Amstar | 4.00 |  |
| Flour Salt | 0.40 |  |

-continued

| | % weight | % weight |
|---|---|---|
| LIQUID COATING: | | 16.66 |
| Durkee Kaomel Flakes (Partially Hydrogenated Vegetable Oil) | 96.00 | |
| Lecithin, Lucas Meyer Metarin RA-51 | 4.00 | |
| | 100.00 | |

The coated raisins were prepared by introducing the raisins to a rotating coating pan and tumbling the raisins for about 1 minute. The fat component was melted by heating to about 90° F. to 93° F. and blended with the lecithin. The dry coating composition was prepared by uniformly blending the dry ingredients. The melted fat component and the dry powder coating blend were alternately added to the coating pan while continuously tumbling the raisins until the components were depleted. The raisins were tumbled for about 5 minutes at ambient temperature to uniformly coat the raisins. The coating had a chocolate coating due to the presence of the cocoa. The amount of wheat germ present in the dry coating is less than that compared to Example II and resulted in a smoother appearance. The coated raisins were then transferred to a slotted cooling tray and cooled to room temperature using forced air.

The coated raisins had a soft core and a smooth outer coating with the slightly crunchy texture of the wheat germ. The textures of the coated raisins remain constant during storage in a sealed container.

EXAMPLE IV

Raisins were coated with shredded wheat fines and almond meal coating where the proportions are as follows:

| | % weight | % weight |
|---|---|---|
| RAISINS: Thompson Seedless Select | | 41.67 |
| DRY COATING: | | 41.67 |
| Shredded Wheat Fines | 35.50 | |
| Almonds, Blue Diamond Natural Meal, 12M Cut | 33.30 | |
| Powdered Brown Sugar, Amstar | 30.60 | |
| Flour Salt | 0.60 | |
| LIQUID COATING: | | 16.66 |
| Durkee Kaomel Flakes (Partially Hydrogenated Vegetable Oil) | 96.00 | |
| Lecithin, Lucas Meyer Metarin RA-51 | 4.00 | |
| | 100.00 | |

The coated raisins were prepared by introducing the raisins to a rotating coating pan and tumbling the raisins for about 1 minute. The fat component was melted by heating to about 90° F. to 93° F. and blended with the lecithin. The dry coating composition was prepared by uniformly blending the dry ingredients. The melted fat component and the dry powder coating blend were alternately added to the coating pan while continuously tumbling the raisins until the components are depleted. The raisins were tumbled for about 5 minutes at ambient temperature to uniformly coat the raisins. The coated raisins were then transferred to a slotted cooling tray and cooled to room temperature using forced air. This example used shredded wheat fines having a particle size of about 1/32 to 1/16 of an inch. The shredded wheat fines produced a crunchier product compared to the wheat germ coating of Examples I to III. The coating produced a distinctive nutty appearance to the product.

The coated raisins had a soft core and a smooth outer coating. The coating had a crunchy texture from the shredded wheat fines. The textures of the coated raisins remain constant during storage in a sealed container.

What is claimed is:

1. A process for producing a coated fruit having a substantially continuous coating enrobing the fruit, wherein the coating has a crunchy texture, the process comprising:
   (a) coating dried fruit pieces with a liquid coating comprising at least one melted fat which is solid or semi-solid at room temperature and is capable of inhibiting moisture migration from the fruit pieces;
   (b) coating the dried fruit pieces of step (a) with a dry particulate coating of at least one particulate cereal component capable of producing a crunchy texture to the coating, and at least one sweetener;
   (c) alternately repeating steps (a) and (b) to form a coated fruit piece with a coating having a predetermined thickness;
   (d) cooling the coated fruit pieces thereby forming a coated fruit having a soft moisture migration inhibiting coating with crunchy cereal particulates.

2. The process of claim 1 wherein the dried fruit is coated in steps (a) and (b) while continuously agitating the dried fruit to form a substantially uniform coating.

3. The process of claim 1 wherein the dried fruit is coated while at a temperature of about 80° F. to about 100° F.

4. The process of claim 1 wherein the dried fruit is coated in a rotating drum.

5. The process of claim 1 wherein the dried fruit is selected from the group consisting of raisins, cranberries, figs, cherries, prunes, pineapples apples, bananas, apricots, dates and currants.

6. The process of claim 5 wherein the dried fruit has a moisture content of about 13% to about 18% by weight.

7. The process of claim 1 wherein the cereal component of the dry particulate coating includes at least one cereal from the group consisting of wheat germ, oat bran, wheat bran and shredded wheat particulates.

8. The process of claim 7 wherein the shredded wheat has a particle size of about 1/32 to about 1/16 inch.

9. The process of claim 1 wherein the dry particulate coating includes a nut flavoring, nut meal or nut particles.

10. The process of claim 9 wherein the nut flavoring, nut meal or nut particles are selected from the group consisting of almond, walnut, pecan, macadamia, peanut and hazel nut.

11. The process of claim 9 wherein the nut meal or nut particles have a particle size between about 12 mesh and about 16 mesh.

12. The process of claim 1 wherein the sweetener of the dry particulate coating is selected from the group consisting of granular sucrose, brown sugar, fructose, glucose, maltose, dextrose, and corn syrup solids.

13. The process of claim 1 wherein the dry particulate coating is added to the dried fruit in substantially equal parts by weight of the dried fruit.

14. The process of claim 1 wherein the dry particulate coating comprises substantially equal parts by weight of the cereal component, sweetener, and at least one nut meal.

15. The process of claim 1 wherein the dry particulate coating comprises about 20% to 40% cereal, about 20% to 40% sweetener, and about 25% to 40% nut meal.

16. The process of claim 1 wherein the liquid coating comprises about 10% to 20% by weight based on the total weight of the coated fruit pieces.

17. The process of claim 1 wherein the liquid coating is a hard butter, fatty acid, fatty acid glyceride, partially hydrogenated or interesterified vegetable oils or mixtures thereof.

18. The coated dried fruit prepared according to the process of claim 1.

19. A coated dried fruit having a substantially continuous moisture resistant coating containing a crunchy particulate cereal component, wherein the coating comprises:
  (a) at least one substantially uniform first coating of a fat component on the dried fruit, wherein the fat is a solid or semi-solid at room temperature; and
  (b) at least one second coating on the first coating of fat, wherein the second coating comprises at least one crunchy particulate cereal component capable of producing a crunchy texture to the moisture resistant coating, and a sweetener.

20. The dried fruit of claim 19 wherein the dried fruit is selected from the group consisting of raisins, cranberries, figs, cherries, pineapple, prunes, apples, bananas, apricots, dates and currants.

21. The dried fruit of claim 20 wherein the dried fruit has a moisture content of about 13% to about 18% by weight.

22. The dried fruit of claim 19 wherein the cereal component of the dry particulate coating includes at least one particulate cereal from the group consisting of toasted wheat germ and shredded wheat particles.

23. The dried fruit of claim 22 wherein the shredded wheat has a particle size of about 1/32 to about 1/16 inch.

24. The dried fruit of claim 19 wherein the dry particulate coating includes at least one nut flavoring, nut particles or nut meal.

25. The dried fruit of claim 24 wherein the nut flavoring, nut meal or nut particles are selected from the group consisting of almond, walnut, pecan, macadamia, peanut and hazel nut.

26. The dried fruit of claim 24 wherein the nut meal has a particle size between about 12 mesh and about 16 mesh.

27. The dried fruit of claim 19 wherein the sweetener of the dry particulate coating is selected from the group consisting of granular sucrose, brown sugar, fructose, glucose, maltose, dextrose, and corn syrup solids.

28. The dried fruit of claim 19 wherein the dry particulate coating comprises substantially equal parts by weight of the cereal component, sweetener and at least one nut meal.

29. The dried fruit of claim 19 wherein the dry particulate coating comprises about 20% to 40% cereal, about 20% to 40% sweetener, and about 25% to 40% nut meal.

30. The dried fruit of claim 19 wherein the liquid coating comprises about 10% to 20% by weight based on the total weight of the coated pieces.

31. The dried fruit of claim 19 wherein the liquid coating is a hard butter, fatty acid, fatty acid glyceride, partially hydrogenated or interesterified triglyceride or mixture thereof.

* * * * *